Feb. 22, 1944.   T. C. APPLEMAN   2,342,108
COFFEE MAKER
Filed July 15, 1942
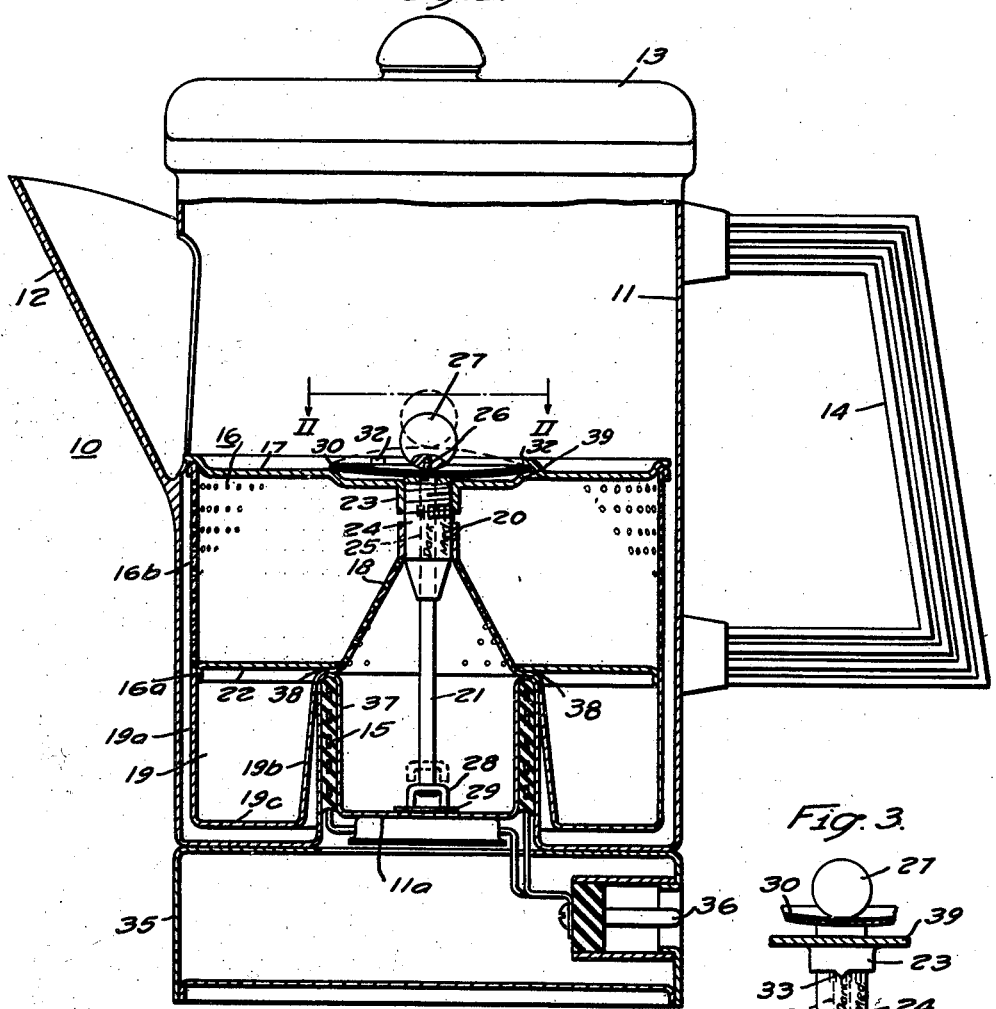
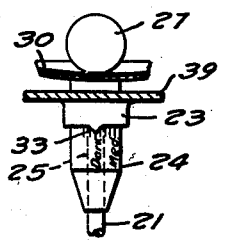
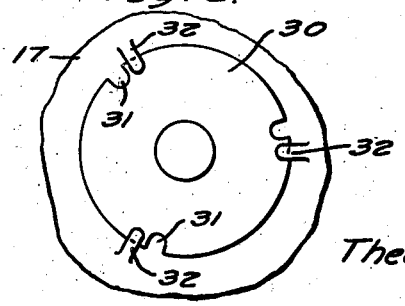
WITNESSES:
INVENTOR
Theodore C. Appleman
BY
W. R. Coley
ATTORNEY Patented Feb. 22, 1944

2,342,108

UNITED STATES PATENT OFFICE 2,342,108

COFFEE MAKER

Theodore C. Appleman, Mansfield, Ohio, assignor to Westinghouse Electric & Manufacturing Company, East Pittsburgh, Pa., a corporation of Pennsylvania Application July 15, 1942, Serial No. 450,949

7 Claims. (Cl. 99—283)

My invention relates to coffee makers, and more particularly to automatic coffee makers.

It is an object of my invention to provide a coffee maker in which the coffee grounds are immersed during the infusion period and which will be automatically removed from contact with the infusion liquid at the end of a predetermined brewing cycle.

A further object of my invention is to provide a simple, inexpensive, automatic coffee maker which will be foolproof and which may be easily and readily adjusted so as to produce coffee of any desired strength.

Still a further object of my invention is to provide an automatic coffee maker in which the coffee grounds will be retained in an immersed position for a variable predetermined length of time and which will be moved to an elevated position above the infusion liquid after said time by means of a buoyant device.

Another object of my invention is to provide an automatic coffee maker in which the coffee grounds are maintained in an immersed position by means of a magnetic clutch.

Still another object of my invention is to provide an automatic coffee maker having a buoyant coffee basket structure held in an immersed position during a variable infusion period by a magnetic clutch which is released at the end of said period by a readily adjustable thermal-responsive device.

Other objects of my invention will either be pointed out specifically in the course of the following description of a device embodying my invention, or will be apparent from such description, reference being had to the accompanying drawing, in which:

Figure 1 is a vertical sectional view of a coffee maker embodying my invention;

Fig. 2 is a fragmentary view taken along the line II—II of Fig. 1, and

Fig. 3 is a view in elevation of a portion of the device shown in Fig. 1.

Referring to the accompanying drawing, there is shown a coffee maker 10 having a liquid infusing or steeping vessel 11 provided with a spout 12, a suitable cover 13 and a handle 14. The vessel 11 rests upon and is attached to a suitable base 35, in keeping with established practice, with electrical receptacle prongs 36 in one side thereof. An upwardly extending cylindrical-like folded portion 37 is formed within the bottom of the vessel. Said portion 37 is open at the bottom to receive a suitable upwardly extending substantially cylindrical heating element 15 which supplies heat to the infusing liquid. However, it is to be understood that any other suitable heating element may be used.

Positioned within the vessel 11 is a coffee basket or container 16. The coffee basket or container 16 is preferably cylindrical in form and embodies a side wall 16b of perforated material. A suitable imperforate cover 17 is positioned upon the container so as to hold the coffee grounds therein as the container is immersed within the liquid. The bottom wall 22 of the coffee container 16 is formed of a solid sheet metal plate, annular in form and having a downturned peripheral flange 16a for a purpose to be set forth. A reentrant frusto-conical portion 18, of perforated metal extends upwardly through the central opening of wall 22. In addition, a depending annular air chamber or buoyant device 19 having substantially the same exterior diameter as the coffee container 16 is attached to and movable with said coffee container 16, as described in detail below. An axially positioned opening 20 extends through the apex of the conical reentrant portion 18 of the container 16 so as to permit a depending stem 21 to pass therethrough.

The side wall 16b of said coffee basket or container 16, the outer side 19a, inner side 19b and bottom 19c of the buoyant chamber 19, and the reentrant portion 18 of the basket 16 are preferably formed from a single sheet of metal, say, by a spinning operation.

The inner side 19b of buoyant chamber 19 extends downwardly and outwardly whereby the distance across the bottom 19c of said chamber is less than that across the bottom wall 22 (or the top wall of said chamber 19). In addition, a horizontally extending shoulder 38 is formed within said single sheet of metal at the top of the inner side 19b of chamber 19 and at the bottom of reentrant portion 18. The annular washer-like bottom wall or member 22 of coffee basket 16 is rigidly attached to the coffee basket and buoyant chamber structure with an airtight fit by having the depending flange 16a attached to the top of the outer side 19a of the buoyant chamber 19 and the bottom of the container 16. The inner portion of the member 22 is then rigidly attached to the top of shoulder 38 so as to form the bottom of said coffee basket 16 and the top of the air chamber or buoyant device 19. By making the connections between member 22 and the outer wall 16b and 19a airtight, it follows that the buoyant chamber 19 will be air-tight. This will then cause said chamber 19 to normally hold the coffee basket 16 in a position above the coffee brew. However, during the time the coffee basket 16 is retained in its lowermost position, the shoulder 38 rests upon the upper edge of the folded portion 37 about heating element 15. The bottom 19c of chamber 19 is thus held a short distance above the bottom of vessel 11. In addition, the outward tapered inner wall 19b of said chamber 19 is spaced away from the heating element 15 and folded portion 37. The coffee brew or liquid is thus positioned about all sides of said buoyant chamber 19. Accordingly, said combined structure of coffee container 16 and chamber 19 must be retained in a lower position during the brewing action, otherwise the buoyant action of said chamber 19 will keep the coffee grounds in an elevated position above the liquid in vessel 11.

The cover 17 for the coffee container 16 has a central depressed portion 39 provided with a depending inwardly threaded flanged portion 23 having a substantially greater diameter than stem 21 to permit said stem 21 to pass therethrough. An exteriorly threaded sleeve 24 is rotatably positioned within the flanged portion 23 so as to be carried by the cover 17. Said sleeve 24 extends downwardly through opening 20 in reentrant portion 18 and has a longitudinally extending opening 25 therethrough for slidably receiving the stem 21. Said stem 21 is an elongated rod-like member of such length as to extend from near the top of coffee basket 16 to a point near the bottom of the vessel 11. A relatively small-diameter upwardly-extending threaded portion 26 is integral with the upper end of stem 21 so as to receive a ball-like handle 27, used to raise or lower the cover 17 from or upon the coffee basket 16.

A clutch, preferably comprising a substantially inverted U-shaped magnet 28 is rigidly attached to the lower end of the stem 21. Said magnet 28 has a width substantially equal to the diameter of the sleeve 24 so as to permit the stem 21 and magnet 28 to be removed upwardly through the opening 20 in basket 16 and through flanged portion 23 of cover 17, when desired. The magnet 28 engages a steel plate 29 rigidly attached to the central portion 11a of the bottom of the vessel 11 when the coffee basket 16 and cover 17 are in an immersed position. Of course, if bottom wall 11a is of steel, plate 29 is not necessary. The steel plate 29 cooperates with the magnet 28 so as to operate as a magnetic clutch and retain the coffee basket 16 and buoyant chamber 19 in an immersed or operative position as long as the magnet 28 is in engagement with said plate 29. Said retaining action is automatically broken by a thermal responsive device 30 in response to a predetermined increase in temperature of the infusion liquid.

The thermal responive device 30 is preferably a bimetallic snap-acting disk of a familiar form. Said disk 30 is positioned about the upper end or threaded portion 26 of the stem 21, being peripherally retained in position by upstruck portions 32 of cover 17, and is held rigidly thereagainst by means of the handle 27 which is threaded down upon the disk so as to hold it against the upper end of the stem 21 proper. The bimetallic disk 30 is slightly concave upwardly at room temperature, but flexes to a convex upward position at a temperature corresponding to that required to produce the desired infusion of the coffee. The convex upwardly movement of disk 30 also carries the stem 21 upwardly so as to disengage the magnetic clutch 28, 29 and permit the coffee basket 16 to be raised out of the infusion liquid by the buoyancy of chamber 19.

A plurality of inwardly extending peripheral notches 31 are positioned within the bimetallic disk 30 so as to cooperate with upstruck portions or fingers 32 formed within the cover 17. The fingers 32 are of sufficient length to fit over the edge of the disk 30 so as to normally hold it in engagement with the cover 17 adjacent the depressed portion 39, whereby the periphery of said disk 30 is maintained in a relatively fixed position. The disk 30, however, may be rotated with respect to the cover 17 and fingers 32 which have a width slightly less than notches 31, so that the notches 31 will be in line with said fingers. The disk 30, when in such a position, may be upwardly removed from said cover 17 or if slightly rotated, may be operatively positioned as illustrated.

When operating a coffee maker 10 embodying my invention, a suitable quantity of coffee grounds is positioned within the coffee container or basket 16, whereupon the cover 17 thereof, carrying disk 30, handle 27, sleeve 24, stem 21 and magnet 28, is placed in position thereupon. The bimetallic disk 30 being at room temperature will then be in a slightly concave upwardly position. A quantity of infusion liquid is placed within the vessel 11 leaving a suitable air space thereabove, and the coffee container 16 and buoyant chamber 19, being substantially a unitary structure, are then positioned within the vessel 11 and moved into their lower positions illustrated in solid lines in Fig. 1. The magnet 28 then engages the steel plate 29 and, due to the magnetic attraction therebetween, will hold the coffee basket 16 and buoyant chamber 19 in an immersed position, as shown. The heating element 15 is then connected through receptacle prongs 36 to a suitable power supply by means of any well known appliance cord (not shown). The infusion liquid then increases in temperature and the coffee is brewed in a well known manner. As the infusion liquid increases in temperature to a predetermined value, which determines the strength of the brew, the bimetallic disk 30 will snap into its upper position, illustrated by dotted lines in Fig. 1, disengaging the magnet 28 from the steel plate 29. The coffee container 16 and buoyant chamber 19 are then free to move upwardly within the vessel. Accordingly, the buoyant chamber 19 will raise the coffee basket 16 to a position where the grounds are above the surface of the brew into the illustrated air space. This action will separate the coffee grounds from the infusion liquid at the desired strength of said brew.

If it be desired to vary the strength of the brew, the cover 17 may be rotated with respect to the opening 20 about an intermediate portion of the stem 21. This action causes the bimetallic disk to be forced into a more or less concave upwardly position so as to vary, in a well known manner, the temperature at which the bimetallic disk 30 will snap to its upward position, thus varying the length of time in which the coffee grounds will be immersed within the infusion liquid, thereby resulting in various strengths of brew, depending upon the desires of an operator.

A scale 33 (see Fig. 3) may be located upon the side of the sleeve 24 to enable the operator to readily position the cover 17 at any desired point so as to automatically produce a coffee brew of any desired strength, by correspondingly varying the operating temperature of the bimetallic disk 30.

Various modifications may be made in the device embodying my invention without departing from the spirit and scope thereof, and I desire therefore that only such limitations shall be placed thereon as are imposed by the prior art and the appended claims.

I claim as my invention:

1. In a coffee maker comprising an infusion chamber for receiving the infusing liquid and means for heating said liquid, the combination of a container for ground coffee disposed in said infusion chamber, a buoyant chamber attached to said container, said container and buoyant chamber moving as a unit, releasable magnetic means for retaining said coffee container and buoyant chamber in a submerged position, and means responsive solely to the temperature of the liquid for releasing said magnetic retaining means at a predetermined temperature of said liquid, whereby said coffee container is lifted by the buoyant chamber to a higher position.

2. In a coffee maker comprising an infusion chamber for receiving the infusing liquid and means for heating said liquid, the combination of a container for the ground coffee disposed in said infusion chamber, a buoyant chamber attached to said container, said container and buoyant chamber moving as a unit, magnetic means for retaining said coffee container and buoyant chamber in a submerged position, and a bimetallic element carried by said coffee container and buoyant chamber unit, said bimetallic element releasing said magnetic retaining means at a predetermined temperature of said liquid, whereby said coffee container is lifted by the buoyant chamber to a higher position.

3. A device for making coffee and the like comprising a vessel for receiving an infusing liquid, a container in the vessel for receiving the coffee, buoyant means in said vessel attached to said coffee container, a magnetic clutch for retaining said coffee container and buoyant means in an immersed position during the infusing period and for releasing said coffee container and buoyant means at the termination of said period, said clutch embodying a magnet carried by said coffee container and buoyant means, and a bimetallic element connected to the magnet for bodily moving said magnet to release said magnetic clutch at a predetermined temperature of the infusion.

4. A device for making coffee and the like comprising a vessel for receiving an infusing liquid, a container in the vessel for receiving the ground coffee, buoyant means in said vessel attached to said coffee container, and a magnetic clutch for retaining said coffee container and buoyant means in an immersed position during the infusing period and for releasing said coffee container and buoyant means at the termination of said period, a vertically moving stem carried by said container and buoyant means, a bimetallic element carried by said container and attached to the stem to move said stem in response to temperature changes of the liquid, and a magnet attached to the lower end of said stem for engaging the bottom portion of the vessel to retain the coffee container and buoyant means in an immersed position, said bimetallic element raising the stem and magnet at a predetermined temperature to release said magnet whereby the buoyant means lifts the coffee container to an elevated position above the liquid.

5. A device for making coffee and the like comprising a vessel for receiving an infusing liquid, a container in the vessel for receiving the ground coffee, buoyant means in said vessel attached to said coffee container, and a magnetic clutch for retaining said coffee container and buoyant means in an immersed position during the infusing period and for releasing said coffee container and buoyant means at the termination of said period, a vertically moving stem carried by said container and buoyant means, a bimetallic element carried by said container and attached to the stem to move said stem in response to temperature changes of the liquid, and a magnet attached to the lower end of said stem for engaging the bottom portion of the vessel to retain the coffee container and buoyant means in an immersed position, said bimetallic element raising the stem and magnet at a predetermined temperature to release said magnet whereby the buoyant means lifts the coffee container to an elevated position above the liquid, and means for selectively adjusting the temperature of operation of said bimetallic element to vary the length of time the coffee is immersed.

6. A device for making coffee and the like comprising a vessel for receiving an infusion liquid, a basket-like container in the vessel for receiving the coffee, a removable cover for said container, a bimetallic element attached to said cover, a depending stem passing through said container and carried by the element, a magnet positioned at the bottom of said stem for engaging the bottom of the vessel to retain the container in an immersed position, said bimetallic element moving to an upper position at a predetermined temperature of the liquid to raise the magnet from the bottom of the vessel, and an annularly shaped air chamber positioned about the stem and attached to the container for moving the container, bimetallic element stem and magnet to an elevated position upon the raising of the magnet whereby the coffee container will be positioned above the liquid.

7. A device for making coffee and the like, comprising a vessel for receiving an infusion liquid, a basket-like container in the vessel for receiving the coffee, a removable cover for said container, a bimetallic element attached to said cover, a depending stem passing through said container and carried by the element, a magnet positioned at the bottom of said stem for engaging the bottom of the vessel to retain the container in an immersed position, said bimetallic element moving to an upper position at a predetermined temperature of the liquid to raise the magnet from the bottom of the vessel, and an annularly shaped air chamber positioned about the stem and attached to the container for moving the container, bimetallic element stem and magnet to an elevated position upon the raising of the magnet whereby the coffee container will be positioned above the liquid.

THEODORE C. APPLEMAN.